(No Model.)
J. F. HEY.
MEANS FOR SUPPORTING JOURNAL BOXES.
No. 493,499. Patented Feb. 14, 1893.
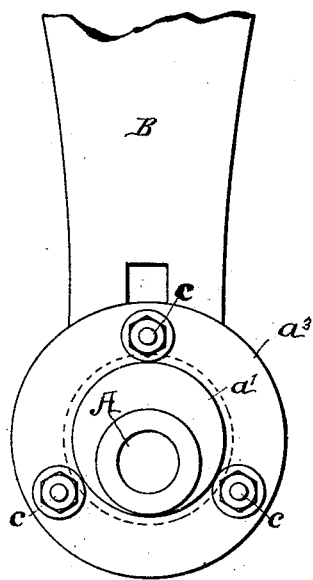
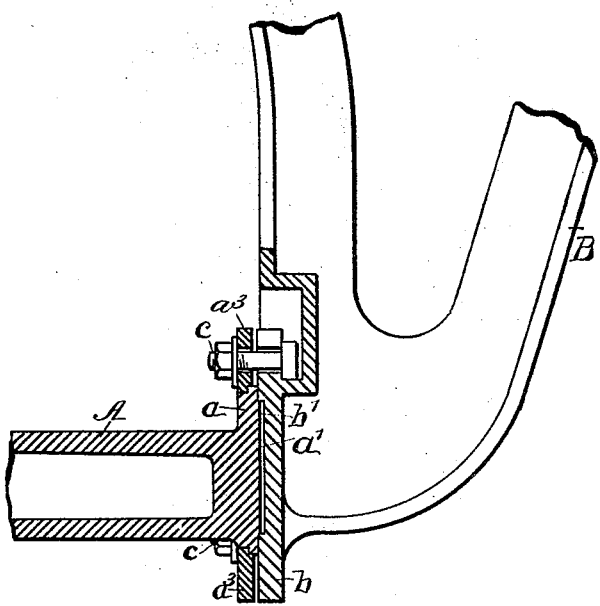
WITNESSES:
INVENTOR
ATTORNEYS.

UNITED STATES PATENT OFFICE.

JOHANN FRIEDRICH HEY, OF STRASBURG, GERMANY.

MEANS FOR SUPPORTING JOURNAL-BOXES.

SPECIFICATION forming part of Letters Patent No. 493,499, dated March 14, 1893.

Application filed November 9, 1891. Serial No. 411,251. (No model.) Patented in Germany April 30, 1891, No. 60,881.

*To all whom it may concern:*

Be it known that I, JOHANN FRIEDRICH HEY, engineer, a subject of the King of Prussia and German Emperor, residing at Strasburg, in Alsace, in the Kingdom of Prussia and German Empire, have invented certain new and useful Improvements in Means for Supporting Journal-Boxes, (which has been patented in Germany, numbered 60,881, and dated April 30, 1891;) and I do hereby declare the following to be a full, clear, and exact description of the invention, such as will enable others skilled in the art to which it appertains to make and use the same.

The object of the invention is to provide a new and improved means for supporting journal boxes which is simple and durable in construction and arranged for convenient adjustment according to the position of the shaft.

The invention consists of certain parts and details and combinations of the same, as will be described hereinafter and then pointed out in the claims.

Reference is to be had to the accompanying drawings forming a part of this specification, in which similar letters of reference indicate corresponding parts in all the figures.

Figure 1 is a front view of the improvement; and Fig. 2 is a sectional side elevation of part of the same as applied.

The improved bearing support is provided with a base made in the form of a pivot or pin A for supporting the bearing body. The base is mounted to turn eccentrically so that it is raised or lowered when turned to bring the bearing body to the proper position for the shaft.

The base is provided with a pin A, formed with a flange or disk $a$ arranged eccentric to the pin and provided on its rear face with a circular offset $a'$ concentric to the said flange. This offset engages and is mounted to turn in a suitable circular recess $b'$ formed on a disk $b$ of the hanger B or bracket B' shown in dotted lines in Fig. 1.

In order to hold the base in place on the hanger B and to permit its adjustment thereon the flange or disk $a$ is rabbeted and is engaged by the ring $a^3$ correspondingly rabbeted and secured to the hanger B by the bolts $c$. When the latter are screwed up the ring $a^3$ clamps the disk $a$ and prevents its turning, but when the bolts are loosened the flange $a$ can be turned to adjust the pin A to the proper position.

By the above described construction, it will be seen that when the bolts are loosened a complete revolution can be given to the pin A and its flange or disk $a$, thereby permitting a wide range of adjustment.

Having thus described my invention, what I claim as new, and desire to secure by Letters Patent, is—

1. The combination with a bracket or hanger, of a bearing support provided with an eccentric disk or flange, and a ring secured to the bracket or hanger and engaging the said disk or flange, substantially as and for the purpose set forth.

2. The combination with a bracket or hanger provided with a disk having a circular recess, of a bearing support provided with an eccentric disk or flange having an offset projecting into the recess of the disk of the bracket or hanger, and a ring secured to the bracket or hanger and engaging the front face of the eccentric flange or disk, substantially as herein shown and described.

In testimony whereof I affix my signature in presence of two witnesses.

J. FRIEDRICH HEY.

Witnesses:
    A. SALTZER,
    P. HEY.